(12) United States Patent
Matsuda et al.

(10) Patent No.: US 12,415,206 B2
(45) Date of Patent: Sep. 16, 2025

(54) ULTRASONIC DEVICE

(71) Applicant: SEIKO EPSON CORPORATION, Tokyo (JP)

(72) Inventors: Hiroshi Matsuda, Gifu (JP); Kanechika Kiyose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1024 days.

(21) Appl. No.: 17/469,597

(22) Filed: Sep. 8, 2021

(65) Prior Publication Data

US 2022/0080460 A1 Mar. 17, 2022

(30) Foreign Application Priority Data

Sep. 16, 2020 (JP) .................. 2020-155377

(51) Int. Cl.
*B06B 1/06* (2006.01)
(52) U.S. Cl.
CPC .................. *B06B 1/0666* (2013.01)
(58) Field of Classification Search
CPC ................................................ H10N 30/0872
See application file for complete search history.

(56) References Cited

U.S. PATENT DOCUMENTS

| 7,342,351 | B2 | 3/2008 | Kubo et al. |
| 10,296,135 | B2* | 5/2019 | Imazeki ............... H01L 23/3192 |
| 2010/0052473 | A1* | 3/2010 | Kimura ................ H03H 9/059 |
| | | | 29/25.35 |
| 2010/0270891 | A1* | 10/2010 | Kohda ................ H03H 9/1035 |
| | | | 29/25.35 |
| 2017/0031024 | A1 | 2/2017 | Kiyose et al. |
| 2017/0155028 | A1* | 6/2017 | Kiyose ................ H10N 30/802 |
| 2021/0223213 | A1* | 7/2021 | Matsuda .............. B06B 1/0662 |

FOREIGN PATENT DOCUMENTS

| JP | 2010103479 A | 5/2010 |
| JP | 2017029270 A | 2/2017 |
| WO | 2004105237 A1 | 12/2004 |

* cited by examiner

*Primary Examiner* — J. San Martin
(74) *Attorney, Agent, or Firm* — CHIP LAW GROUP (57) ABSTRACT

An ultrasonic sensor includes: a first substrate including an ultrasonic element; a first electrode and a second electrode on the first substrate; a second substrate having a through-hole that penetrates from a first surface facing the first substrate to a second surface; and a gap material that separates the first substrate and the second substrate from each other, in which in a plan view from a +Z direction, the through-hole overlaps with the first electrode and the second electrode, and the gap material surrounds the through-hole, the through-hole has a narrow portion, and a width of the narrow portion is smaller than a width of the through-hole in the first surface, in a direction orthogonal to the +Z direction.

9 Claims, 5 Drawing Sheets

ULTRASONIC DEVICE

The present application is based on, and claims priority from JP Application Serial Number 2020-155377, filed Sep. 16, 2020, the disclosure of which is hereby incorporated by reference herein in its entirety.

BACKGROUND

1. Technical Field

The present disclosure relates to an ultrasonic device.

2. Related Art

In the related art, an ultrasonic device including ultrasonic elements has been known. In such an ultrasonic device, a plurality of elements and a plurality of terminal portions are provided on an element substrate, and the plurality of terminal portions and electrodes such as flexible printed circuits (FPCs) are electrically coupled to each other. For example, JP-A-2017-29270 discloses a wiring structure of an ultrasonic device in which a terminal portion of an element substrate and electrodes of FPCs are electrically coupled to each other via a through-hole provided in a sealing plate for protecting a plurality of elements.

However, the wiring structure described in JP-A-2017-29270 has a problem that the manufacturing cost tends to increase. Specifically, the FPC is bent and inserted into the through-hole in a terminal region, and a contact is covered with a protective member. Therefore, a mounting process becomes complicated and is thus difficult to be automated. In addition, since the FPC is mounted via the through-hole, the wiring structure also has a problem that the FPC is easily removed from the through-hole when a force such as a tensile force is applied to the FPC. That is, there has been a demand for an ultrasonic device capable of reducing manufacturing costs and implementing steady mounting with a simple configuration.

SUMMARY

An ultrasonic device includes: a first substrate including an ultrasonic element; an electrode on the first substrate; a second substrate having a through-hole that penetrates from a first surface facing the first substrate to a second surface opposite to the first surface; and a gap material interposed between the electrode and the second substrate and separating the first substrate and the second substrate, in which the second substrate is stacked in a first direction with respect to the first substrate, in a plan view from the first direction, the through-hole overlaps with the electrode, and the gap material surrounds the through-hole, the through-hole has a narrow portion, and a width of the narrow portion is smaller than a width of the through-hole in the first surface, in a second direction orthogonal to the first direction.

DESCRIPTION OF EXEMPLARY EMBODIMENTS

In each of the following drawings, as necessary, X, Y, Z axes are assigned as mutually orthogonal coordinate axes, a direction indicated by each arrow is denoted as + direction, and a direction opposite to the + direction is denoted as a − direction. A +Z direction may be referred to as an upper side and a −Z direction may be referred to as a lower side. In the present specification, a first direction is referred to as the +Z direction. A second direction orthogonal to the first direction is a direction orthogonal to a direction along a Z axis, for example, a direction along an X axis.

Furthermore, in the following description, for example, a description for a substrate of "on the substrate" indicates any one of a case in which a component is disposed on the substrate in contact therewith, a case in which a component is disposed on the substrate via another structure, or a case in which a part of a component is disposed on the substrate in contact therewith, and another part is disposed on the substrate via another structure.

1. First Embodiment

In the present embodiment, an ultrasonic sensor is exemplified as an ultrasonic device having one or more ultrasonic elements that generate ultrasonic waves by vibration. A configuration of an ultrasonic sensor 1 according to a first embodiment will be described with reference to FIGS. 1 and 2.

Figure 1:
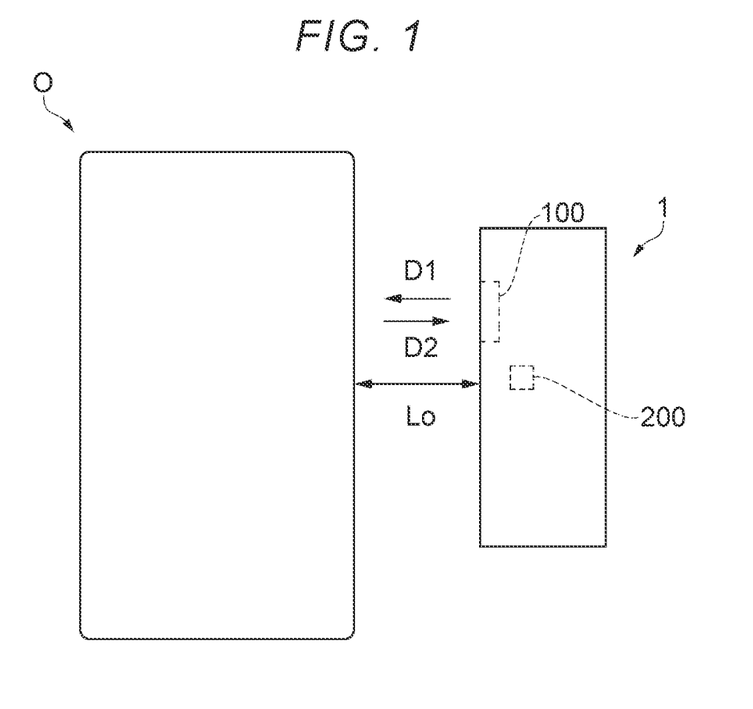
FIG. 1 is a schematic view illustrating a function of an ultrasonic sensor as an ultrasonic device according to a first embodiment.

As illustrated in FIG. 1, the ultrasonic sensor 1 includes an ultrasonic transceiver 100 and a timer 200. The transceiver 100 transmits ultrasonic waves in a transmission direction D1 and receives the ultrasonic waves reflected from an object O in a reception direction D2. The ultrasonic waves transmitted by the transceiver 100 are generated by an ultrasonic element on a transmission side, which will be described later. In addition, the ultrasonic waves received by the transceiver 100 are received by an ultrasonic element on a reception side, which will be described later.

The timer 200 measures a time from when the transceiver 100 transmits ultrasonic waves to when the ultrasonic waves reflected from the object O are received. As a result, the ultrasonic sensor 1 measures a distance Lo between the ultrasonic sensor 1 and the object O.

Figure 2:
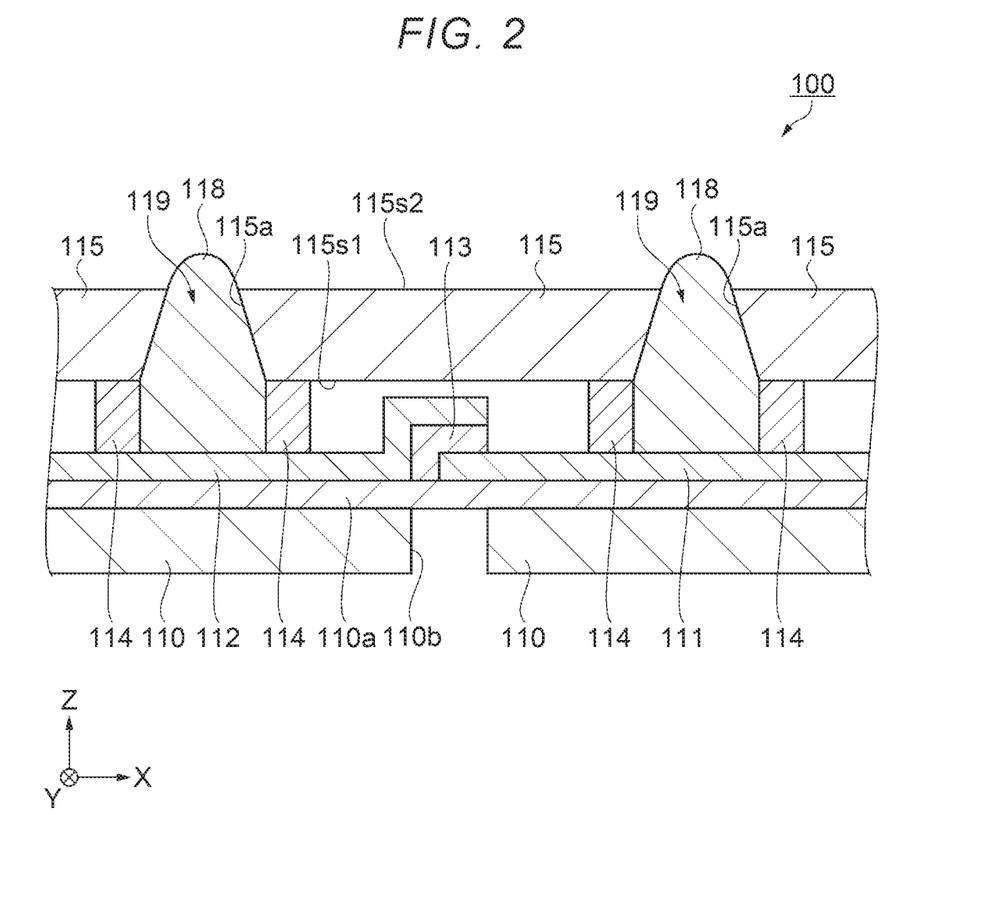
FIG. 2 is a schematic cross-sectional view illustrating a configuration around an ultrasonic element.

As illustrated in FIG. 2, the transceiver 100 includes a first substrate 110 including an ultrasonic element 113, a first electrode 111 and a second electrode 112 as electrodes, gap materials 114, and a second substrate 115. The ultrasonic element 113 includes the ultrasonic element 113 on the transmission side and the ultrasonic element 113 on the reception side. Since the ultrasonic element 113 on the transmission side and the ultrasonic element 113 on the reception side have the same configuration, and may be collectively simply referred to as the ultrasonic element 113 hereafter.

The transceiver 100 has a vibration plate 110a, the first electrode 111 or the second electrode 112, the gap material 114, and the second substrate 115 which are stacked in this order from the first substrate 110 upward. The second substrate 115 is stacked in the +Z direction with respect to the first substrate 110 via the gap material 114 or the like.

An opening 110b is formed in the first substrate 110. The opening 110b penetrates the first substrate 110. A vibration plate 110a is stacked on the first substrate 110. Therefore, the vibration plate 110a in a region corresponding to the opening 110b functions as a vibratable film exposed in the −Z direction.

When a voltage is applied to the first electrode 111, the ultrasonic element 113 on the transmission side expands and contracts in a direction along the X axis and a direction along the Y axis. As a result, the vibration plate 110a in the region vibrates to generate ultrasonic waves. The ultrasonic waves are transmitted from the opening 110b corresponding to the ultrasonic element 113 on the transmission side toward the object O. After the ultrasonic waves are reflected from the object O, the vibration plate 110a vibrates via the opening 110b, and the vibration is received by being transmitted to the ultrasonic element 113 on the reception side. Therefore, the opening 110b is made to face the object O when using the ultrasonic sensor 1.

The materials of the first substrate 110 include, for example, silicon (Si), magnesium oxide (MgO), lanthanum aluminate ($LaAlO_3$), sapphire, gallium arsenide (GaAs), zirconium oxide ($ZrO_2$), and aluminum oxide ($Al_2O_3$), and the like are applied. Examples of a material of the vibration plate 110a can include silicon oxide ($SiO_2$), silicon nitride (SiN), zirconium oxide ($ZrO_2$), aluminum oxide ($Al_2O_3$), titanium oxide ($TIO_2$), magnesium oxide (MgO), and lanthanum aluminate ($LaAlO_3$), and hafnium oxide ($HfO_2$).

The first electrode 111 or the second electrode 112 is disposed on the first substrate 110 via the vibration plate 110a. The ultrasonic element 113 is disposed above the opening 110b. A part of a lower side of the ultrasonic element 113 is disposed to be in contact with the vibration plate 110a, and the other part thereof is disposed to be in contact with the first electrode 111. A side surface and an upper side of the ultrasonic element 113 in the −X direction are in contact with the second electrode 112. That is, one end of the ultrasonic element 113 and the first electrode 111, and the other end of the ultrasonic element 113 and the second electrode 112 are electrically coupled to each other. Since the ultrasonic element 113 is electrically coupled to the first electrode 111 and the second electrode 112, it is possible to drive the ultrasonic element 113 to generate ultrasonic waves or receive the ultrasonic waves.

The gap material 114 is disposed in the −X direction and the +X direction, which are lateral to the ultrasonic element 113, and the second substrate 115, which is a protective substrate of the ultrasonic element 113, is disposed above the ultrasonic element 113. The ultrasonic element 113 is housed in a space substantially enclosed vertically and laterally. The gap material 114 surrounds a through-hole 115a in a frame shape in a plan view from the +Z direction. The detailed form of the gap material 114 will be described later.

A known piezoelectric body is applied to the ultrasonic element 113. An Example of a material of the piezoelectric body can include a composite oxide having a perovskite ($ABO_3$) structure. Specific examples thereof can include a lead-based composite oxide such as lead zirconate titanate (PZT), a bismuth iron acid (BFO)-based material, and a lead-free composite oxide such as sodium potassium niobate (KNN). Using the lead-based composite oxide becomes easier to secure a displacement amount of vibration in the ultrasonic element 113. Using the lead-free composite oxide becomes easier to promote environmental friendliness.

In the BFO-based material, bismuth (Bi) is located at A site of the perovskite structure and iron (Fe) is located at B site. Elements other than Bi, Fe, and oxygen (O) may be added to the BFO-based material. Examples of the elements can include manganese (Mn), aluminum (Al), lanthanum (La), barium (Ba), titanium (Ti), cobalt (Co), cerium (Ce), samarium (Sm), chromium (Cr), potassium (K), lithium (Li), calcium (Ca), strontium (Sr), vanadium (V), niobium (Nb), tantalum (Ta), molybdenum (Mo), tungsten (W), nickel (Ni), zinc (Zn), praseodymium (Pr), neodymium (Nd), and europium (Eu). Among them, one or more of the elements may be included.

Elements other than K, sodium (Na), Nb, and O may be added to the KNN-based material. Examples of the elements can include Mn, Li, Ba, Ca, Sr, zirconium (Zr), Ti, Bi, Ta, antimony (Sb), Fe, Co, silver (Ag), magnesium (Mg), Zn, copper (Cu), V, Cr, Mo, W, Ni, Al, silicon (Si), La, Ce, Pr, Nd, promethium (Pm), Sm, and Eu. Among them, one or more of the elements may be included.

The composite oxide having a perovskite structure includes those having a composition shifted from stoichiometric composition due to deficiency of atoms or presence of excess atoms in a crystal structure, and those whose element is partially substituted with other elements. That is, those having an inevitable shift of the composition due to lattice mismatch, oxygen deficiency, and the like, and partial substitution with the elements are allowed as long as the perovskite structure can be obtained.

The materials of the first electrode 111 and the second electrode 112 are not particularly limited as long as they have conductivity. Examples of the materials of the first electrode 111 and the second electrode 112 can include metallic materials such as platinum (Pt), iridium (Ir), gold (Au), Al, Cu, Ti, and stainless steel, tin oxide-based conductive materials such as indium tin oxide (ITO) and fluorine-doped tin oxide (FTC)), a zinc oxide-based conductive material, oxide conductive materials such as ruthenium-based strontium, lanthanum nickelate, and element-doped strontium titanate, a conductive polymer, and the like.

The gap material 114 is disposed on the first electrode 111 and the second electrode 112. The gap material 114 is interposed between the first electrode 111 and the second substrate 115 and the second electrode 112 and the second substrate 115. The first substrate 110 and the second substrate 115 are separated by the gap material 114 to form the above-described space in which the ultrasonic element 113 is housed.

As will be described in detail later, the gap material 114 is located so as not to overlap with the ultrasonic element 113 and the opening 110b in a plan view from the +Z direction, and is formed so that each of the first electrode 111 and the second electrode 112 are individually partially surrounded in a frame shape. In the first electrode 111 and the second electrode 112, a region surrounded by the gap material 114 in a frame shape serves as an electrical contact with a conductive resin as described later. That is, in each of the first electrode 111 and the second electrode 112, the region surrounded by the frame-shaped gap material 114 becomes an electrode terminal that is simple and easy to be miniaturized. The detailed form of the gap material 114 will be described later.

The gap material 114 is formed of, for example, a curable resin such as a photocurable type resin. As a result, a distance between the first substrate 110 and the second substrate 115 in the direction along the Z axis is formed with high accuracy.

The second substrate 115 is supported by the gap material 114 above the ultrasonic element 113, the first electrode 111, and the second electrode 112. The second substrate 115 has a first surface 115s1 facing the first substrate 110 in a direction along the Z axis, and a second surface 115s2 opposite to the first surface 115s1. The same material as that of the first substrate 110 is applied to the second substrate 115.

The second substrate 115 has the through-hole 115a. The through-hole 115a penetrates from the first surface 115s1 to the second surface 115s2 in the second substrate 115. The through-hole 115a is disposed corresponding to each of the frame-shaped gap materials 114, overlaps with the first electrode 111 and the second electrode 112 and does not overlap with the ultrasonic element 113, in a plan view from the +Z direction. Since the ultrasonic element 113 is disposed in a space formed by the first substrate 110, the second substrate 115, and the gap material 114, vibrations transmitted or received by the ultrasonic element 113 are not hindered.

A recess 119 whose upper portion is opened by a region surrounded by the gap material 114 in a frame shape and the through-hole 115a is formed. The recess 119 is filled with a conductive resin 118. The conductive resin 118 is electrically coupled to each of the first electrode 111 and the second electrode 112. The conductive resin 118 serves as a connection wire for mounting in the transceiver 100.

The conductive resin 118 is formed by filling the recess 119 with a silver paste or the like and solidifying the silver paste or the like. An end on an upper portion of the conductive resin 118 is protruded upward from the second substrate 115 by making a volume of the filled conductive resin 118 larger than an internal volume of the recess 119. The portion protruded upwardly in the conductive resin 118 serves as a small mounting terminal that is easy to be mounted.

Figure 3:
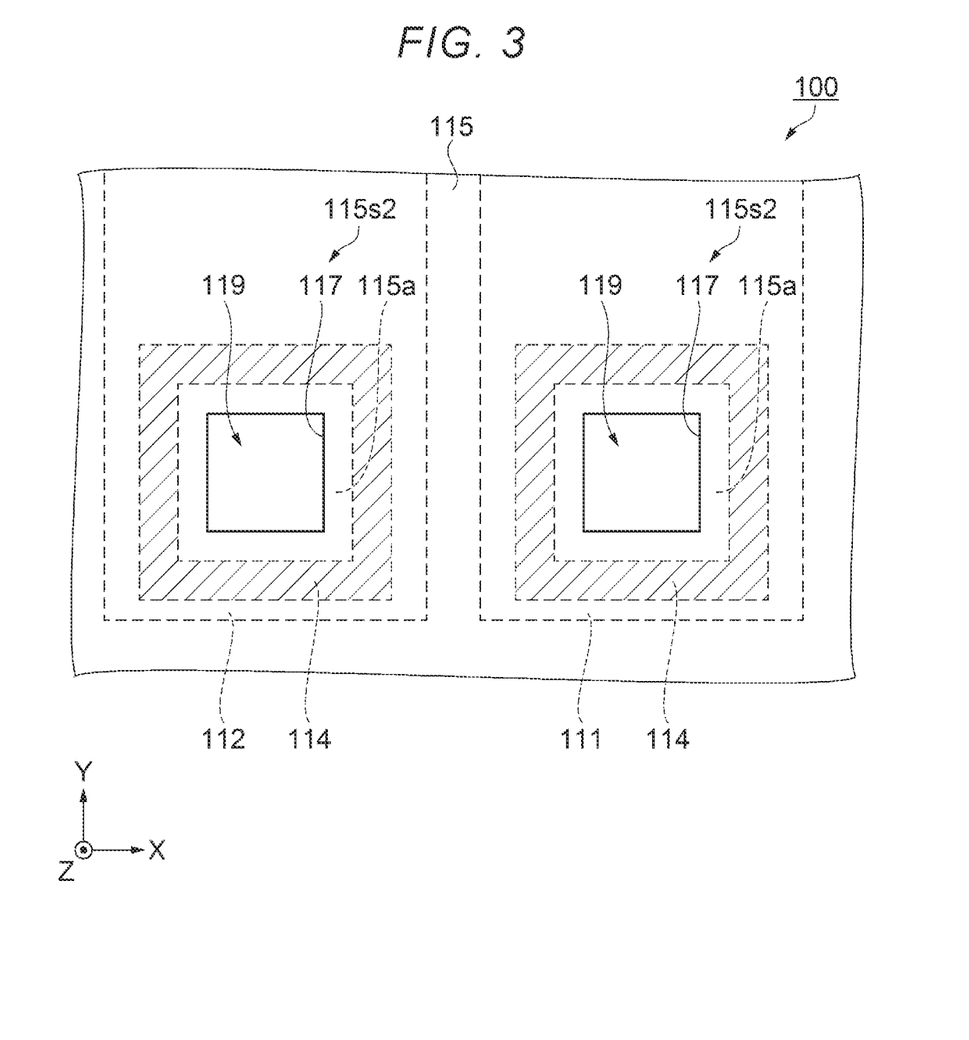
FIG. 3 is a schematic plan view illustrating a form of a second substrate.
Figure 4:
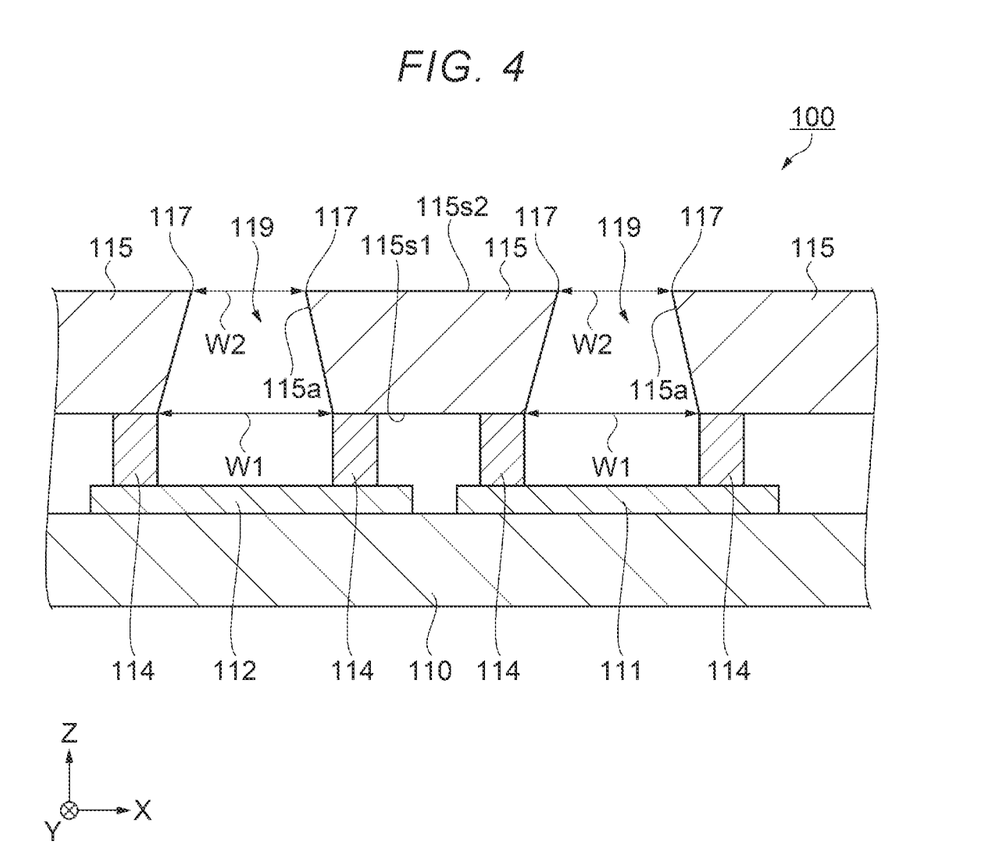
FIG. 4 is a schematic cross-sectional view illustrating a form of the second substrate.

The detailed form of the gap material 114 will be described with reference to FIGS. 3 and 4. In FIGS. 3 and 4, for convenience of illustration, the ultrasonic element 113, the vibration plate 110a, the conductive resin 118, and the like are omitted, and other configurations are simplified. Further, in FIG. 3, the gap material 114, the first electrode 111, the second electrode 112, and the like shielded by the second substrate 115 are transmitted through the second substrate 115 and indicated by a broken line.

As illustrated in FIG. 3, in a plan view from the +Z direction, the through-hole 115a corresponding to the first electrode 111 overlaps with the first electrode 111, and the through-hole 115a corresponding to the second electrode 112 overlaps with the second electrode 112. That is, one first electrode 111 or one second electrode 112 corresponds to one through-hole 115a. Although not illustrated, the +Y direction of the first electrode 111 and the second electrode 112 leads to the wire on the first substrate 110.

The through-hole 115a has a narrow portion 117. The narrow portion 117 is formed on the second surface 115s2. That is, the narrow portion 117 is disposed at a boundary with the second surface 115s2 in the through-hole 115a. The narrow portion 117 is not limited to being disposed on the second surface 115s2 in the through-hole 115a. The through-hole 115a corresponding to the first electrode 111 and the through-hole 115a corresponding to the second electrode 112 have the same form. The details of the narrow portion 117 will be described later.

The gap material 114 is formed in a frame shape and surrounds the through-hole 115a in a plan view from the +Z direction. The gap material 114 formed on the first electrode 111 and the gap material 114 formed on the second electrode 112 have the same forms.

Since the gap material 114 is formed in a flat frame shape, it is possible to prevent the conductive resin 118 from flowing out and coming into contact with the ultrasonic element 113 or the like when the recess 119 is filled with the conductive resin 118.

As illustrated in FIG. 4, the narrow portion 117 is in the through-hole 115a and is disposed on the second surface 115s2. A width W2 of the narrow portion 117 is smaller than a width W1 of the through-hole 115a in the first surface 115s1 in the direction along the X axis orthogonal to the +Z direction. That is, the width of the through-hole 115a becomes smaller in a tapered shape from the first surface 115s1 to the second surface 115s2, in the direction along the X axis. Although the width W1 and the width W2 are illustrated in FIG. 4 when viewed from the −Y direction, a width relationship between the width W1 and the width W2 is not limited to a case where the width W1 and the width W2 are viewed from the −Y direction. The width W1 and the width W2 may correspond to a direction other than the direction along the X axis, which is orthogonal to the +Z direction.

The above-described tapered shape of the through-hole 115a can be formed, for example, by performing wet etching on the second substrate 115 from the first surface 115s1 side. Accordingly, the narrow portion 117 can be easily formed.

The recess 119 has a shape in which the first electrode 111 or second electrode 112 side is large and an upper portion is small in the through-hole 115a. Therefore, forming the conductive resin 118 in the recess 119 can make the conductive resin 118 difficult to be removed from the recess 119.

Shapes of the gap material 114 and the through-hole 115a are not limited to being substantially rectangular, and may be circular or elliptical, in a plan view from the +Z direction. In addition, a configuration in which each of the first electrode 111 and the second electrode 112, and the second substrate 115 are in contact with the gap material 114 has been illustrated in the present embodiment, but the present disclosure is not limited thereto. The gap material 114 may be in indirect contact with the first electrode 111 and the second electrode 112, or the second substrate 115 via an adhesive or the like.

In the present embodiment, the ultrasonic sensor 1 that measures the distance Lo from the object O is illustrated as an ultrasonic device, but the ultrasonic device is not limited thereto. The ultrasonic device may be, for example, a flow rate sensor, an object detection sensor, an image sensor, a power generation element, or the like.

According to the present embodiment, the following effects can be obtained.

With a simple configuration, manufacturing costs can be reduced and mounting can be steadily implemented. Specifically, the first electrode 111 and the second electrode 112 are each surrounded by the frame-shaped gap material 114 in a plan view from the +Z direction, and one of the first electrode 111 and the second electrode 112 corresponds to one through-hole 115a. Therefore, the conductive resin 118 is filled from the through-hole 115a to the recess 119 to form a mounting terminal. Further, it is possible to form a mounting terminal by pulling the wire electrically coupled to the first electrode 111 and the second electrode 112 out from the through-hole 115a and filling a non-conductive material or the like in the recess 119. As a result, an electrode terminal for mounting is formed with a simple configuration. Therefore, the work of bending an FPC becomes unnecessary, and the mounting process becomes easy to be automatized. In addition, an FPC insertion mechanism and a fixing mechanism are not required.

Moreover, the through-hole 115a has a width that becomes smaller from the first surface 115s1 on the first substrate 110 side toward the narrow portion 117 at an upper side. Therefore, when the conductive material or non-conductive material flows into the through-hole 115a to form an electrode terminal in the mounting process, the narrow portion 117 functions to prevent the electrode terminal from being removed. Furthermore, as compared with the through-hole 115a formed of the surfaces along the Z axis, an adhesive area of the through-hole 115a and the conductive material or the like is increased, thereby improving an adhesive force. As a result, the electrode terminal can be steadily mounted. As described above, it is possible to provide the ultrasonic sensor 1 capable of reducing manufacturing costs and implementing steady mounting with a simple configuration.

2. Second Embodiment

An ultrasonic sensor in the present embodiment is exemplified as an ultrasonic device as in the first embodiment. The ultrasonic sensor according to the present embodiment has a different form of the through-hole 115a in the second substrate 115, as compared with the transceiver 100 included in the ultrasonic sensor 1 of the first embodiment. Therefore, the same reference numerals are used for the same constituent parts as those in the first embodiment and duplicate descriptions thereof will be omitted.

Figure 5:
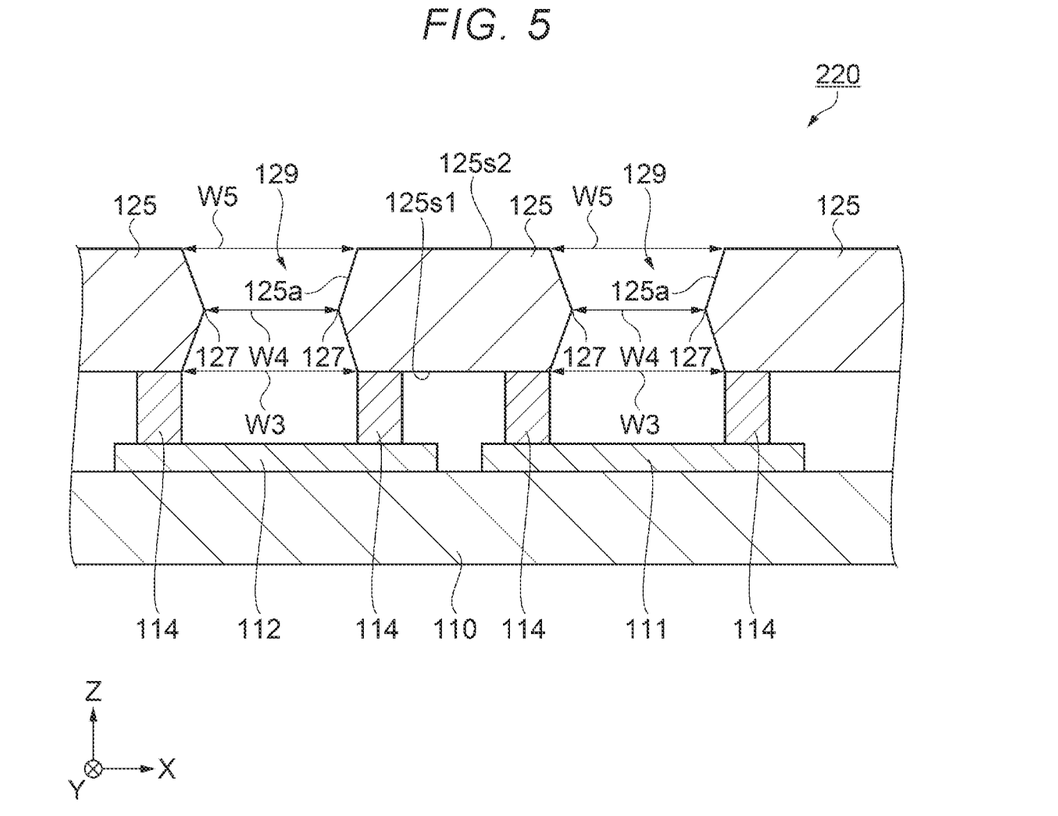
FIG. 5 is a schematic cross-sectional view illustrating a form of a second substrate according to a second embodiment.

A detailed form of the second substrate 125 in a transceiver 220 according to the present embodiment will be described with reference to FIG. 5. In FIG. 5, the ultrasonic element 113, the vibration plate 110a, the conductive resin 118, and the like are omitted for convenience of illustration, and other configurations are simplified, as in FIG. 4 of the first embodiment.

As illustrated in FIG. 5, the transceiver 220 included in the ultrasonic sensor of the present embodiment includes a first substrate 110 including an ultrasonic element 113 (not illustrated), a first electrode 111 and a second electrode 112 on the first substrate 110, a second substrate 125 having a through-hole 125a, and gap materials 114 interposed between the first electrode 111 and the second substrate 125 and between the second electrode 112 and the second substrate 125 and separating the first substrate 110 and the second substrate 125.

The second substrate 125 is supported by the gap material 114 above the ultrasonic element 113, the first electrode 111, and the second electrode 112. The second substrate 125 has a first surface 125s1 facing the first substrate 110 in a direction along the Z axis, and a second surface 125s2 opposite to the first surface 125s1. The same material as that of the second substrate 115 of the first embodiment is applied to the second substrate 125.

The second substrate 125 has the through-hole 125a. The through-hole 125a penetrates from the first surface 125s1 to the second surface 125s2 in the second substrate 125. The through-hole 125a is disposed corresponding to each of the frame-shaped gap materials 114, overlaps with the first electrode 111 and the second electrode 112 and does not overlap with the ultrasonic element 113, in a plan view from the +Z direction. Since the ultrasonic element 113 is disposed in a space formed by the first substrate 110, the second substrate 125, and the gap material 114, vibrations transmitted or received by the ultrasonic element 113 are not hindered.

A recess 129 whose upper portion is opened by a region surrounded by the gap material 114 in a frame shape and the through-hole 125a is formed. The recess 129 is filled with a conductive resin 118 (not illustrated). The conductive resin 118 is electrically coupled to each of the first electrode 111 and the second electrode 112. The conductive resin 118 serves as a connection wire for mounting in the transceiver 100.

A narrow portion 127 is in the through-hole 125a and is disposed between the first surface 125s1 and the second surface 125s2. A width W4 of the narrow portion 127 is smaller than a width W3 of the through-hole 125a in the first surface 125s1 and a width W5 of the through-hole 125a in the second surface 125s2, in the direction along the X axis orthogonal to the +Z direction. That is, the through-hole 125a becomes smaller in a tapered shape from the first surface 125s1 toward the narrow portion 127, and becomes smaller in a tapered shape from the second surface 125s2 toward the narrow portion 127. The narrow portion 127 is provided in a form projecting from the recess 129. In this case, although the widths W3, W4, and W5 are illustrated in FIG. 5 when viewed from the −Y direction, a width relationship between the widths W3 and W5 and the width W4 is not limited to a case where the widths W3, W4, and W5 are viewed from the −Y direction. The widths W3, W4, and W5 may correspond to a direction other than the direction along the X axis, which is orthogonal to the +Z direction.

The narrow portion 127 of the through-hole 125a can be formed by, for example, performing wet etching on the second substrate 125 from two directions, the first surface 125s1 side and the second surface 125s2 side. Accordingly, the narrow portion 127 can be easily formed.

As a result, the recess 129 has a shape in which the middle is small and upper and lower portions are large in the direction along the Z axis in the through-hole 125a. Therefore, forming the conductive resin 118 in the recess 129 can make the conductive resin 118 difficult to be removed from the recess 129.

The width relationship between the width W3 and the width W5 is not particularly limited, but it is preferable that the width W5 is smaller than the width W3. Accordingly, in addition to the narrow portion 127, the through-hole 125a on the second surface 125s2 side is smaller than the through-hole 125a on the first surface 125s1 side, and thus, the mounting terminal formed in the recess 129 can be made more difficult to remove.

Shapes of the gap material 114 and the through-hole 125a are not limited to being substantially rectangular, and may be circular or elliptical, in a plan view from the +Z direction. In addition, a configuration in which the second substrate 125 is in contact with the gap material 114 has been illustrated in the present embodiment, but the present disclosure is not limited thereto. The gap material 114 may be in indirect contact with the second substrate 125 via an adhesive or the like.

In the present embodiment, the ultrasonic sensor that measures the distance Lo from the object O is illustrated as an ultrasonic device, but the ultrasonic device is not limited thereto.

According to the present embodiment, the same effect as that of the first embodiment can be obtained.

What is claimed is:

1. An ultrasonic device comprising:
a first substrate including an ultrasonic element;

an electrode on the first substrate;
a second substrate having a through-hole that penetrates from a first surface facing the first substrate to a second surface opposite to the first surface;
a gap material formed of a curable resin and interposed between the electrode and the second substrate and separating the first substrate and the second substrate; and
a conductive resin electrically coupled to the electrode and disposed on a space surrounded by the electrode, the through-hole, and the gap material, wherein
the gap material is in direct contact with the second substrate,
the second substrate is stacked in a first direction with respect to the first substrate,
the conductive resin protrudes from the second substrate toward the first direction,
in a plan view from the first direction, the through-hole overlaps with the electrode, and the gap material surrounds the through-hole,
the through-hole has a narrow portion,
a width of the narrow portion is smaller than a width of the through-hole in the first surface, in a second direction orthogonal to the first direction, and
a width of the space surrounded by the electrode, the through-hole, and the gap material is equal to the width of the through-hole in the first surface.

2. The ultrasonic device according to claim 1, wherein the narrow portion is formed at the second surface, and the width of the through-hole becomes smaller from the first surface toward the second surface in the second direction.

3. The ultrasonic device according to claim 1, wherein the narrow portion is formed between the first surface and the second surface.

4. The ultrasonic device according to claim 1, wherein the ultrasonic element does not overlap with the through-hole in the plan view from the first direction.

5. The ultrasonic device according to claim 2, wherein the ultrasonic element does not overlap with the through-hole in the plan view from the first direction.

6. The ultrasonic device according to claim 3, wherein the ultrasonic element does not overlap with the through-hole in the plan view from the first direction.

7. The ultrasonic device according to claim 1, wherein the narrow portion is formed at a middle portion of the first surface and the second surface,
the through-hole becomes smaller in a tapered shape from the first surface to the middle portion, and
the through-hole becomes smaller in the tapered shape from the second surface to the middle portion.

8. The ultrasonic device according to claim 1, wherein a volume of the conductive resin is larger than an internal volume of the space surrounded by the electrode, the through-hole, and the gap material.

9. The ultrasonic device according to claim 1, wherein
at least a portion of the electrode is on the ultrasonic element, and
at least the portion of the electrode is in direct contact with the ultrasonic element.

* * * * *